United States Patent [19]

Johnson

[11] 4,143,320
[45] Mar. 6, 1979

[54] ROOF OR FLOOR CB RADIO MOUNT

[76] Inventor: Bradley W. Johnson, 3238 Minnesota Ave., Stevens Point, Wis. 54481

[21] Appl. No.: 772,342

[22] Filed: Feb. 25, 1977

[51] Int. Cl.² ............................................. H01B 1/38
[52] U.S. Cl. ...................................... 325/15; 325/312
[58] Field of Search .................. 325/312, 15; 312/245, 312/253; D12/157; D14/7, 12, 13, 32, 33, 34

[56] References Cited

U.S. PATENT DOCUMENTS

| | | | |
|---|---|---|---|
| 3,059,184 | 10/1962 | Germain | 325/312 |
| 3,405,944 | 10/1968 | Krechman | 325/312 |
| 3,550,001 | 12/1970 | Hanley | 325/312 |
| 3,994,148 | 11/1976 | Anderson | 325/15 |
| 4,088,848 | 5/1978 | Weed | 179/146 R |

OTHER PUBLICATIONS

Kriket CB Speaker, Sound and Safe, Popular Electronics 10/76, p. 25.
Acme Communications Organizer, Communications, Feb. 75, p. 25.
Radio Shack, 1976 Electronics Catalog, p. 153, CB Accessories, CB Mike Clip.

Primary Examiner—Robert L. Griffin
Assistant Examiner—Michael A. Masinick
Attorney, Agent, or Firm—Clarence A. O'Brien; Harvey B. Jacobson

[57] ABSTRACT

A combination loudspeaker enclosure and mounting apparatus particularly useful for radio equipment of the "citizens band" type and adapted for use in an automobile, or the like, the invention provides a speaker enclosure onto one exterior surface of which is removably mounted a citizen's band or other radio or other communication device. The speaker enclosure is shaped so as to present the controls of the equipment to the user thereof at an aspect angle convenient for manipulation of said controls, the speaker itself being mounted within the enclosure at an angle such that sound is projected into the space in which the enclosure is located in a manner which facilitates sensory reception thereof.

6 Claims, 6 Drawing Figures

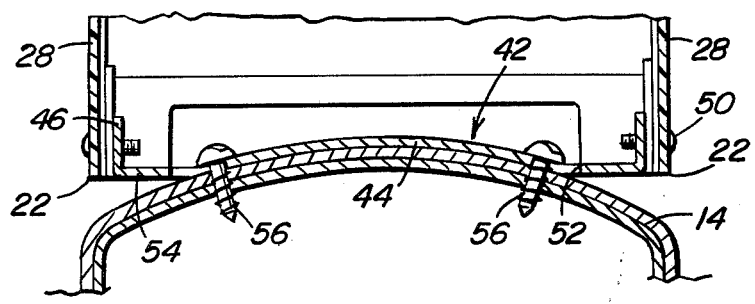
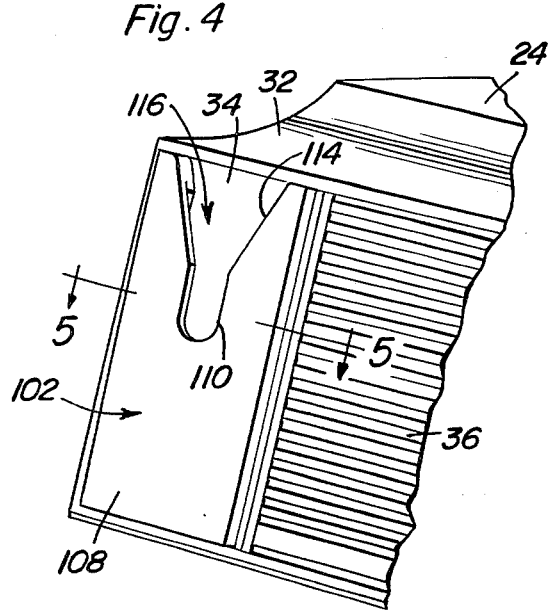
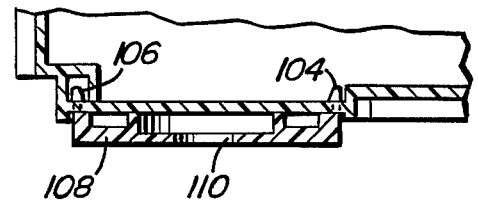
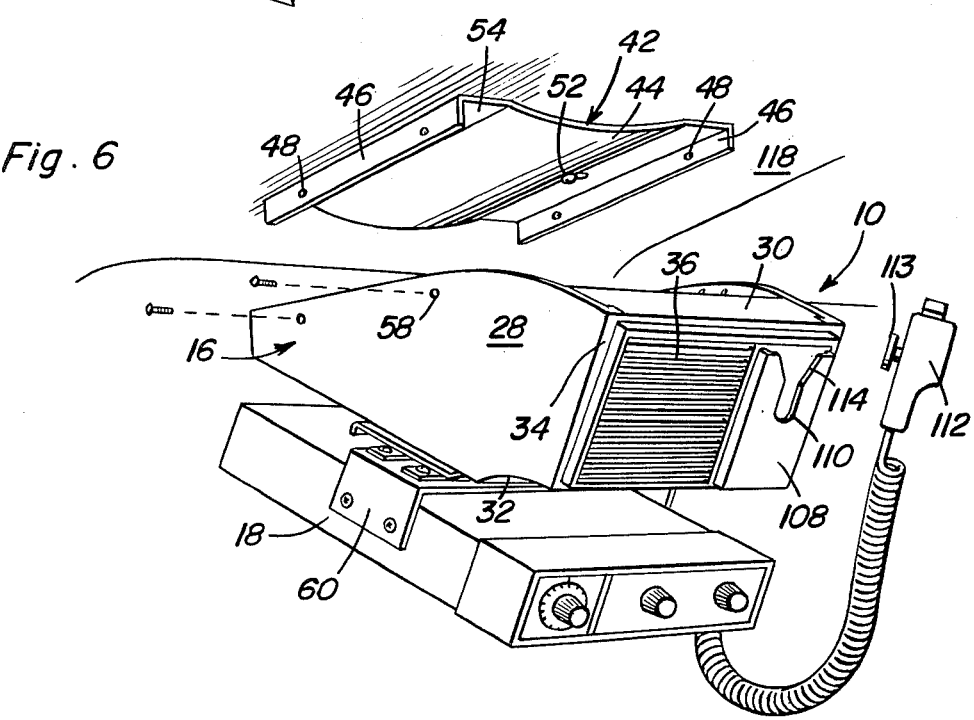

ROOF OR FLOOR CB RADIO MOUNT

BACKGROUND AND SUMMARY OF THE INVENTION

The prior art provides a number of structues useful for housing a loudspeaker, which housings are variously adaptable to be mounted on roof or floor portions of an automobile. For example, Atkinson and Little, U.S. Pat. Nos: 1,930,577 and 2,165,637, respectively, disclose roof mounted speaker housings. Ripple, U.S. Pat. No. 3,882,962, discloses a speaker housing supported on the floorboard of an automobile. The prior art also discloses supporting brackets of varying structure capable of mounting a radio, or the like, on the transmission hump, fire wall, dashboard, or roof of a vehicle and includes slide mounts for such purposes, such as disclosed in U.S. Pat. Nos: 3,153,478, issued May 19, 1970, and 3,822,049, issued July 2, 1974. However, the prior art does not provide structure which, either in actual or implied combination, provides a speaker housing mountable either on floor portions or roof portions of a vehicle and on which housing is disposed a slide bracket for removable mounting of a CB radio, stereo, or the like.

The present invention provides a combined speaker housing and CB radio mounting structure, the housing being securely mountable to the floor or suspendably mountable to the roof of a vehicle. The present speaker housing comprises a primary body portion which is shaped such that the enclosed speaker is positioned in any possible mounting condition to project sound toward the user of the sound equipment. In many prior art CB radio units, speakers mounted within the radio housing direct sound toward the floor of a vehicle, sound clarity being particularly disrupted when the radio unit is positioned on or near the floor of the vehicle. In the present invention, the CB radio is fixedly mounted to one portion of a slide bracket which is removably mounted on the other portion of the slide bracket on the speaker housing. Electrical slide contacts on the slide bracket provide rapidly disconnectable power, antenna, and speaker connections in a well known manner. Therefore, the radio unit can be rapidly dismounted from the speaker housing and disconnected from power, antenna, and speaker leads without the need for removing plug, jack, or other connections. The present structure also positions the controls of the CB radio unit in an easily accessible disposition to the operator of a vehicle in which the structure is mounted. A reversible microphone mount on the speaker housing has a flared upper portion which permits hanging of the microphone on said mount without the need for the operator of the vehicle to divert his eyes from the road.

Accordingly, an object of the invention is to provide a combined speaker housing and sound producing equipment mounting structure configured to propagate sound radiation into central portions of the space in which the structure is disposed in order to facilitate sensory reception of said sound.

A further object of the invention is to provide a combined speaker housing and CB radio mounting structure which can be mounted to either floor or roof portions of a vehicle or of a stationary environmental space, the CB radio being readily removable from the speaker housing.

Another object of the invention is to provide a radio mounting structure which orients the controls of said radio toward an operator of a vehicle in which said structure is mounted to facilitate manipulation of said controls by said operator.

A still further object of the invention is to provide a microphone mounting structure on a CB radio mount which is reversible to allow hanging of the microphone thereof regardless of mounted orientation of the CB radio mount, the microphone mounting structure having flared guide edge portions to facilitate hanging of the microphone on said structure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmental, transverse, sectional view taken along section line 3—3 of FIG. 2.

FIG. 4 is a fragmental, perspective view, partially cut away, of the microphone mounting structure of the invention.

FIG. 5 is a detail sectional view of the microphone mounting taken along section line 5—5 of FIG. 4.

FIG. 6 is an exploded, perspective view of the present invention illustrating mounting of the invention to the roof of a vehicle.

DESCRIPTION OF THE PREFERRED EMBODIMENT

Figure 1:
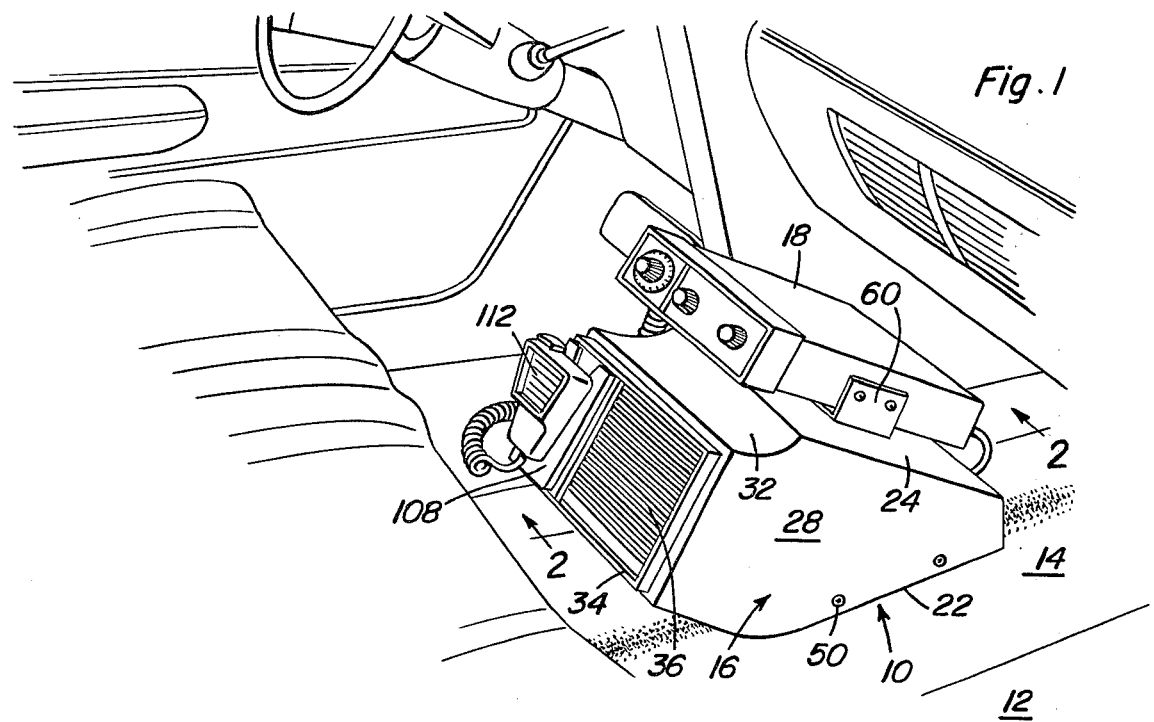
FIG. 1 is a perspective view of the present invention mounted on the transmission hump of an automobile.
Figure 2:
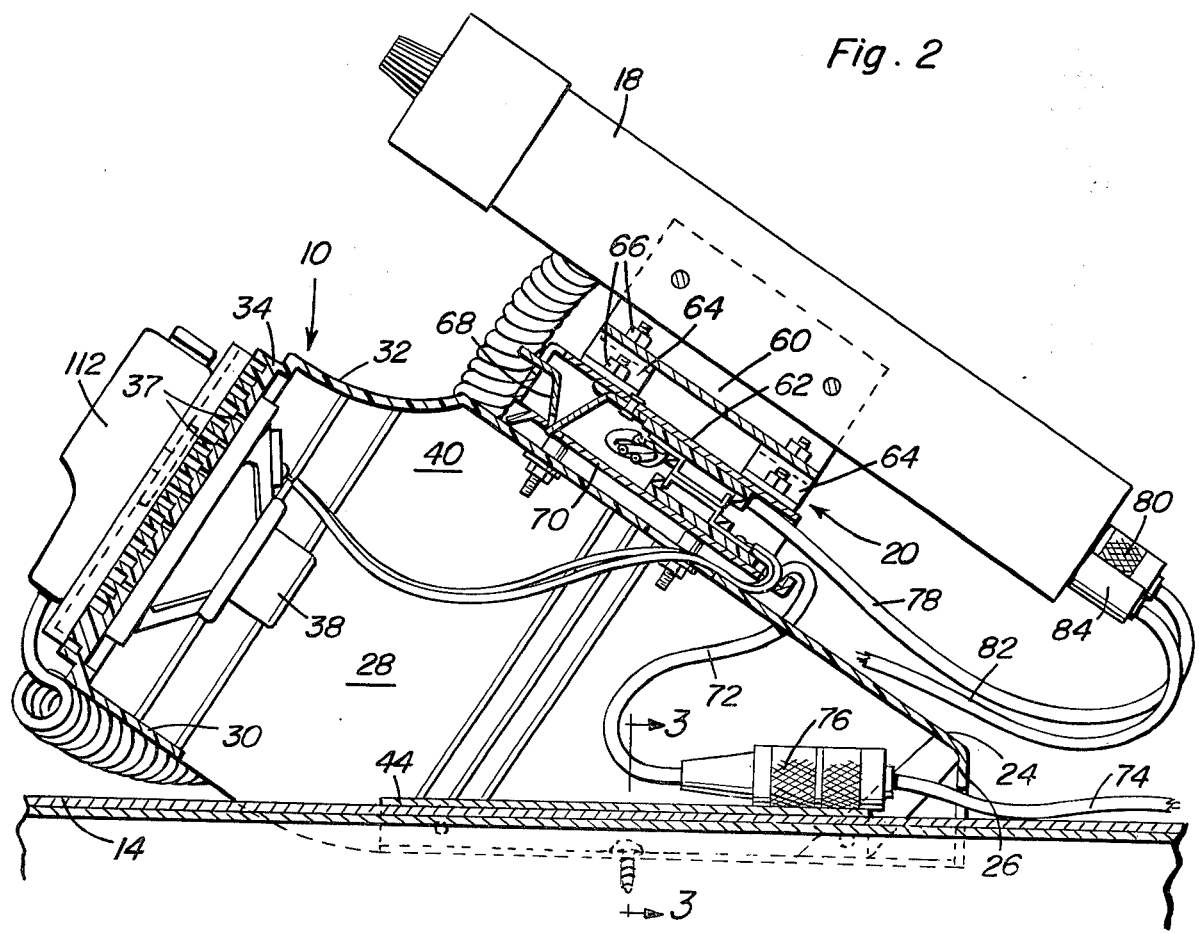
FIG. 2 is a longitudinal sectional view taken generally along section line 2—2 of FIG. 1.

Referring now to FIGS. 1 2, and 3 of the drawings, the radio mount 10 of the present invention is mounted to the floorboard 12 of an automobile, the assembly 10 being particularly seen in FIGS. 1 and 3 to be readily mountable to the usual transmission hump 14 which extends longitudinally of most vehicles. It is to be understood that the mount 10 can be mounted on other surfaces, flat or sloping, such as directly to the floorboard 12, to a dashboard, of to an engine cover such as is normally found in a van or similar vehicle.

Regardless of the surface to which the mount 10 is mounted, including suspension thereof from roof portions of a vehicle or environmental space as will be described hereinafter, the invention is adapted to present controls to ready manipulation by a user thereof and to project sound into essentially central portions of the interior of the vehicle or environmental space for improved sensory reception by users of the mount 10.

The mount 10 comprises a housing 16, a sound unit 18 which may comprise a CB radio, stereo unit, or other similar device, and a slide mounting bracket assembly shown generally at 20 in FIG. 2. The housing 16 is shaped in an essentially triangular structural fashion when viewed in section. The housing 16, as oriented in FIGS. 1 and 2, has straight lower edges 22 which, when the mount 10 is mounted to the floorboard 12, are parallel to the surface of said floorboard. The housing 16 is open between the parallel lower edges 22 on opposite sides of the housing. The housing 16 further comprises a rectangular upper wall surface 24, of which surface 24 is oriented at a desired angle to the lower edges 22, the angle typically being about 30 degrees. A rear rectangular wall 26 and side walls 28 define the housing 16 at rear and side portions of the housing. At the forward ends of the lower edges 22, the housing 16 slopes upwardly at an angle essentially equal to the angle made by the plane of the upper surface 24 to the lower edges 22. A structural member 30 extends between the forward end portions of said lower edges 22. At the forward edge of the upper surface 24, the housing 16 has a curved surface portion 32 which extends outwardly from said surface 24. The forward edges of the members 30, 32 and side walls 28 are joined by an essentially flat face member 34, which member 34 completes the structure of the hollow housing 16. The face member 34 has a sound grille 36 formed over a major portion thereof and provided with slot-like openings 37. A minor portion of the face member 34 provides a flat structural surface having auxiliary microphone mounting structure received thereon as will be described hereinafter. The interior surface of the sound grille 36 has a speaker 38 mounted thereto, the speaker 38 being thereby enclosed within a resonant chamber 40 defined by the housing 16.

The housing 16 is mountable to the floorboard 12, and particularly to the transmission hump 14, of a vehicle by use of a mounting plate 42 which has an arcuate central portion 44 and 90 degrees flanged edge portions 46, the edge portions 46 having spaced holes 48 therein to receive mounting screws 50. Slot-like apertures 52 are provided in the juncture between flat portion 54 and arcuate portion 44. The mounting plate 42 is disposed on the transmission hump 14 at a desired location and holes are then drilled through the hump 14 by using holes 52 as guides. The plate 42 is then fastened to the hump 14 with screws 56. Electrical connections, as will be described hereinafter, are then made between the speaker 38 and other connectors in the housing 16 to other portions of the amount 10 and to locations external of the mount 10 prior to attachment of the housing 16 to the mounting plate 42. Holes 58 are provided above and along the lower edges 22 of the housing 16 which align with the holes 48 in the plate 42, the screws 50 being received through the aligned holes 48 and 58 to secure the housing 16 to the plate 42. The housing 16 is thus mounted to the transmission hump 14 on the floorboard 12 of a vehicle.

The sound unit 18 is mounted to a bracket 60 of the well-known cradle type, such as is normally provided with CB radio units for mounting thereof within a vehicle. The bracket 60 is fixedly mounted to one portion of the slide mounting bracket assembly 20, that is to a male slide plate 62 by means of offset spacer brackets 64 and nut and bolt assemblies 66. The slide plate 62 essentially comprises a box-like body member provided with edge flanges, contact board, electrical connections and a latch member 68 engaging a female support plate 70 mounted on housing 16 and which also includes inturned flanges, contact board, electrical connection and a keeper notch receiving the latch member 68. The specific details of the slide mounting bracket assembly form no specific part of the present invention and may be a commercially available bracket or one disclosed in the aforementioned patents or in copending application Ser. No. 783,082, filed Mar. 30, 1977, by Lowell Morrison et al, which are incorporated herein by reference thereto. It is essential that the slide mounting bracket assembly 20 be readily manipulatable and effectively connect and disconnect the power, antenna coaxial cable, and speaker leads when the CB radio unit is mounted on mount 10 or removed therefrom.

The female support plate 70 has a coaxial cable 72 connected thereto which is connected to the coaxial cable 74 extending to the antenna by a conventional coupler 76. The plate 70 also includes leads to the speaker and leads to a power source on the vehicle. The male plate 62 includes power leads, speaker leads and a coaxial cable 78 connected to the back of the unit 18 by a conventional coupler 80. The speaker leads 82 are connected to unit 18 by a plug 84 inserted into the conventional external speaker jack on the unit 18.

Referring now to FIGS. 4 and 5 of the drawings, a detail view of the face member 34 of the housing 16 is seen to illustrate a microphone mounting hanger 102, the hanger 102 being removably mounted to a portion of the face member 34 by means of tabs 104 on the hanger 102 which snap into slots 106 in the surface of the face member 34. The tabs 104 and slots 106 are regularly arranged so that the hanger 102 can be rotated 180 degrees for either regular or "up-side-down" mounting of the hanger to the housing 16. The hanger 102 is seen to comprise a box-like body member 108 having a shaped cut-away portion 110 in one end thereof for receiving a microphone 112 (shown in FIGS. 1 and 2) therein. The microphone 112 has a conventional headed stud member 113 on the rear thereof which fits into the cut-away portion 110 of the hanger 102. The cut-away portion 110 has flared edges 114 which provide an enlarged mouth at 116, which mouth 116 provides an increased receiving area into which the microphone 112 can be more readily secured with less attention from the operator of a vehicle in which the mount 10 is mounted. Thus, the operator of the vehicle need not divert his attention from the operation of the vehicle in order to hang the microphone 112 on the hanger 102.

Referring now to FIG. 6, the amount 10 is shown as it would appear when mounted from the roof 118 of a vehicle or environmental space. The plate 42 is seen to be mountable to the roof 118 in a manner analogous to mounting of said plate 42 to the transmission hump 14 of a vehicle as described hereinabove. The housing 16 is then mounted to the plate 42 as aforesaid. The microphone mounting hanger 102 is reversed when the housing 16 is mounted as shown in FIG. 6 in order that the flared mouth 116 thereof remains in an upwardly facing disposition. The sound unit 18 can be dismounted from the housing 16 by slidable disconnection of the slide plate 62 from the support plate 70 as aforesaid, regardless of the orientation of the mount 10.

The angular nature of the housing 16 is seen to cause sound from the enclosed speaker 38 to project toward central portions of the space in which the mount 10 is located, whether the mount 10 is mounted to the roof 118 or to the floorboard 12 of a vehicle. Further, controls on the sound unit 18 are also caused to be presented at an aspect angle to the user thereof, especially to an operator of a vehicle, which facilitates ready manipulation of the controls with minimum diversion of the operator's attention from operation of the vehicle. The controls face substantially upwardly when the sound unit 18 is mounted to the housing 16, thereby providing improved viewing of the controls as well as actually causing the controls to be more accessible physically to a user thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combined loudspeaker enclosure and mounting apparatus for a sound producing unit such as a citizen's band radio and the like, comprising:

housing means having an upper surface portion disposed at an angle relative to lower portions of said housing means, the lower portions of said housing means being mountable to environment surfaces such as a floor, a roof, and the like, the plane of the upper surface portion of the housing means being disposed at an angle to said environment surfaces;

speaker means mounted within the housing means to project sound from said housing means in a direction coincident with the plane of the upper surface portion of the housing means; and mounting means for releasably mounting the sound producing unit to the upper surface portion of the housing means, and wherein the sound producing unit has a microphone connected thereto, the housing means further comprising a microphone mounting member, the member having an enlarged slot formed on one end there of which tapers from said end toward the central portion of the member, and means for connecting the member to the housing means comprising tab means on the member, which tab means align with slots disposed in the housing means in either a right-side-up or an up-side-down manner so as to maintain the enlarged mouth of the slot in an upward orientation.

2. The apparatus of claim 1 wherein the housing means further comprise a face member disposed substantially normal to the upper surface portion, the face member having a grille portion and defining the frontal end portion of the housing means, the speaker means being mounted to the inner surface of the grille portion of the face member, the speaker means thereby projecting sound into central interior portions of a space in which the housing means is mounted onto upper or lower environmental surfaces thereof.

3. The apparatus of claim 1 and further comprising mounting plate means adapted to be secured to said environmental surface and to the lower portions of said housing means to mount said housing means to said environmental surface.

4. The apparatus of claim 1 wherein the mounting means comprise:

a female support plate affixed to the upper surface portion of the housing means;

a male slide plate;

means on the female support plate for releasably receiving the male slide plate;

latch means on one of the plates for releasably locking the male slide plate to the female support plate;

means on the male slide plate for mounting the sound producing unit to the male slide plate;

first electrical connectors connected to the female support plate;

second electrical connectors connected to the male slide plate; and, first and second electrical connection mating means on the male slide plate and on the female support plate respectively for effecting a connection between the first and second electrical connectors on reception of the male slide plate into the receiving means on the female support plate.

5. A combined loudspeaker enclosure and mounting apparatus for a sound producing unit such as a citizen's band radio and the like, comprising:

housing means having an upper surface portion disposed at an angle relative to lower portions of said housing means, the lower portions of said housing means being mountable to environmental surfaces such as a floor, a roof, and the like, the plane of the upper surface portion of the housing means being disposed at an angle to said environmental surface;

speaker means mounted within the housing means to project sound from said housing means in a direction coincident with the plane of the upper surface portion of the housing means; and mounting means for releasably mounting the sound producing unit to the upper surface portion of the housing means, and further comprising mounting plate means adapted to be secured to said environmental surface and to the lower portions of said housing means to mount said housing means to said environmental surface, wherein said mounting plate means includes a plate having an arcuately curved central portion adapted to receive and be fastened to the convex surface of the transmission and drive line hump in the floorboard of a vehicle.

6. A CB radio mount for vehicles comprising a housing, said housing including vertically spaced longitudinal wall members and an end wall member, one of said longitudinal wall members including means for mounting the housing on the floorboard or roof of a vehicle with the end wall member positioned for access thereto by a vehicle operator, the other longitudinal wall member including means detachably supporting the CB radio on the housing, said end wall member including means removably supporting the CB radio microphone thereon for access thereto by the vehicle operator;

said microphone support means includes an upwardly opening socket means having outwardly flaring side edge portions guidingly receiving the headed stud on the rear of the microphone to enable the vehicle operator to easily place the microphone into supporting engagement with the end wall member on the housing, said means for mounting the housing including aperture means in said one longitudinal wall member forming template means for drilling fastener receiving holes in the floorboard or roof of the vehicle, and means detachably connecting said one longitudinal wall member to the housing to facilitate use of said one longitudinal wall member as a template means when detached from the housing.

* * * * *